(12) United States Patent
Morman

(10) Patent No.: US 7,313,500 B2
(45) Date of Patent: Dec. 25, 2007

(54) METHOD TO INCREASE THE MAXIMUM ALLOWABLE AMBIENT TEMPERATURE RATING OF AN ELECTRONIC DEVICE

(75) Inventor: Daniel N. Morman, Pullman, WA (US)

(73) Assignee: Schweitzer Engineering Labortories, Inc., Pullman, WA (US)

( * ) Notice: Subject to any disclaimer, the term of this patent is extended or adjusted under 35 U.S.C. 154(b) by 240 days.

(21) Appl. No.: 10/982,366

(22) Filed: Nov. 5, 2004

(65) Prior Publication Data

US 2006/0100798 A1    May 11, 2006

(51) Int. Cl.
    *G01K 1/08* (2006.01)
(52) U.S. Cl. .................................................. 702/132
(58) Field of Classification Search ................. 702/132
    See application file for complete search history.

(56) References Cited

U.S. PATENT DOCUMENTS

| | | | |
|---|---|---|---|
| 5,230,055 A | | 7/1993 | Katz |
| 5,490,059 A | * | 2/1996 | Mahalingaiah et al. ........ 700/46 |
| 5,958,058 A | * | 9/1999 | Barrus ........................ 713/320 |
| 5,974,557 A | | 10/1999 | Thomas |
| 6,052,268 A | | 4/2000 | Thomas |
| 6,119,241 A | | 9/2000 | Michail |
| 6,470,456 B1 | | 10/2002 | Chung-Chih |
| 6,786,637 B2 | | 9/2004 | Kuball et al. |
| 6,813,719 B2 | | 11/2004 | Athas |
| 6,828,779 B2 | | 12/2004 | Townsend et al. |
| 6,950,773 B1 | * | 9/2005 | Gross et al. ................. 702/132 |
| 7,032,119 B2 | * | 4/2006 | Fung ........................ 713/320 |

| | | | |
|---|---|---|---|
| 2002/0087904 A1 | | 7/2002 | Cai |
| 2003/0110423 A1 | * | 6/2003 | Helms et al. ................ 714/100 |
| 2003/0115013 A1 | | 6/2003 | Dendinger |
| 2004/0070910 A1 | | 4/2004 | Gerintscew |

FOREIGN PATENT DOCUMENTS

| | | |
|---|---|---|
| WO | WO 00/04481 | 1/2000 |
| WO | WO 00/04582 | 1/2000 |

OTHER PUBLICATIONS

Gary Herbst, Hitachi's Drive Temperature Indicator Processor (Drive-TIP) helps ensure high drive reliability, Hitachi Global Storage Library, 2004.

* cited by examiner

*Primary Examiner*—John Barlow
*Assistant Examiner*—Lisa Sievers
(74) *Attorney, Agent, or Firm*—Cook, Alex, McFarron, Manzo, Cummings & Mehler, Ltd.

(57) ABSTRACT

A manufacturer determines a maximum ambient temperature for an electronic device to be manufactured. The device has a data processor equipped with a utilization monitor. A test unit of the device is manufactured and placed under test at the maximum ambient temperature. The manufacturer during this test stage runs the application software for the electronic device at this time, in the test state. The temperature of the processor and its utilization reading are observed If the processor temperature increases out of range, then the software should be changed to utilize less processing capacity of the processor. A suitable reduction or adjustment in the software is determined, and the utilization amount is stored in memory. The electronic device is constructed with the alert circuitry and process. Hence, if the user should task the processor beyond the predetermined limit, the electronic device communicates that to the user.

18 Claims, 2 Drawing Sheets

METHOD TO INCREASE THE MAXIMUM ALLOWABLE AMBIENT TEMPERATURE RATING OF AN ELECTRONIC DEVICE

BACKGROUND OF THE INVENTION

The present invention concerns increasing the temperature at which an electronic device containing a digital processor may operate without causing a temperature of the processor to exceed the processor manufacturer's temperature specification.

Essentially all electronic devices are specified to operate within a certain temperature range. Operation outside that temperature range can impair the performance of the electronic device or can even cause irreparable harm to the device. The disclosed invention describes a method to increase the maximum allowable operation temperature of an electronic device, specifically a device that contains a digital processor. Digital processors find application today in a wide variety of products. The term "electronic device" as used herein includes electronic equipment including computers, desktop computers, portable or laptop computers, video or audio systems, control systems, switches, relays, communications devices, power protection systems, input-output modules, power supply modules or power supplies, adapters, suppressors, and all sorts of consumer and industrial electrical products, whether they are stand-alone, rack-mounted, or otherwise configured in their packaging. The term is not limited to just industrial products but also comprehends consumer electronics and vehicular applications. The invention is applicable to electronic devices containing a digital processor.

For example, a processor that is currently in use is a Transmeta Crusoe TM5700. The maximum junction temperature Tj for that processor specified by its manufacturer is 100 degrees C. In specifying a maximum allowable temperature for the electronic device containing the processor, the designer must take into account the several temperature drops involved in the heat transfer from the component to outside air, and must ensure that the sum of these drops does not cause the semiconductor component to exceed its specified maximum junction temperature rating. Users of electronic devices are usually interested in the maximum allowable temperature of the air surrounding the electronic device. Some users desire a higher allowable temperature. This may occur in, for example, an application where heat builds up from either internal sources or environmental sources. Just one example would be within a power station or relay station. There are many other applications where temperature is a factor that must be considered in the design of an electronic device that is to operate in such an environment. For the designer of the electronic device to tolerate an increased maximum allowable temperature of the air surrounding the device, he must decrease the sum of all of the remaining temperature drops to keep the overall sum at a relatively constant level.

The temperature range of a device containing electronic components takes into account several temperatures and temperature differentials ("drops") as contemplated by FIG. 1, which shows a semiconductor integrated circuit 10 having a representative junction 12 within it. Integrated circuit 10 is mounted in a case or package 14. Package 14 is mounted to or on a printed circuit board 16. The printed circuit board 16 is connected to a device chassis 18. The temperature of the junction 12 is affected by the temperatures of the case 14, the inside air temperature, the device chassis temperature, the outside air temperature, and a zero temperature reference.

Hence, the temperature of junction 12 is a function of: (a) the drop 22 from junction 12 to the integrated circuit case 14, (b) the temperature drop 24 from the case 14 to the chassis inside air temperature, (c) the temperature drop 26 from the air surrounding the component (chassis inside air temperature) to the chassis 18, (d) the temperature drop 30 from chassis 18 to the outside air 32 surrounding the electrical device, and (e) the temperature drop 34 from the outside air 32 to the absolute zero temperature reference. The sum of all of these temperature drops determines the junction temperature of the semiconductor device 10. The manufacturer of the semiconductor component 10 specifies the maximum junction temperature of the component for safe, reliable operation of the component.

In rating the maximum allowable temperature for the electronic device containing the semiconductor component 10, the designer of the electronic device must take into account all of these temperature differences and ensure that their sum does not exceed the rating of the semiconductor component. Users of electronic devices are usually interested in the maximum allowable temperature of the air surrounding the electronic device. Some users desire a higher allowable temperature. For the designer of the electronic device to increase the maximum allowable temperature of the air surrounding the device, they must decrease the sum of all of the remaining temperature drops to keep the overall sum from exceeding the maximum rating of the semiconductor component. That is, if the difference between the zero temperature reference and the outside air temperature is increased, then to avoid an increase of the junction temperature, one must decrease one or more of the temperature differentials between the outside air temperature and the junction temperature. With reference to the Transmeta Crusoe TM5700 processor mentioned above, for example, the manufacturer of the electronic device employing that processor will want to determine the maximum ambient temperature that the device can sustain or tolerate without increasing the junction temperature Tj in the processor beyond the 100 degrees C. rating.

Well known ways of decreasing some of the remaining temperature drops include painting the chassis black to help it radiate heat more efficiently (which reduces the chassis to outside air temperature drop), putting cooling fins on the chassis to help convection remove heat from the chassis more efficiently (which also reduces the chassis to outside air temperature drop), putting a fan on or inside the device (which primarily helps reduce the case to inside air temperature drop, but can also reduce the inside air to device chassis temperature drop), putting cooling slots in the chassis (which helps reduce the inside air temperature to outside air temperature drop), connecting the semiconductor package directly to the chassis with a material that has a low thermal resistance (which helps reduce the semiconductor package to device chassis temperature drop), and other approaches.

Many prior art approaches to temperature control involve integrating a temperature sensor so that high temperatures can be detected and dealt with. For example, Hitachi introduced a temperature sensor into its Ultrastar server disk drives so that high temperature conditions are reported to the host system using the Self-Monitoring Analysis and Reporting Technology (SMART) standard. If the computer system is alerted to temperature problems, the user or system administrator can take action. See "Hitachi's Drive Temperature Indicator Processor (Drive-TIP) Helps Ensure High Driver Liability," by Gary Herbst available on an Hitachi web site (http://www.hitachigst.com/hdd/technolo/drivetemp/drivetemp.htm). Herbst mentions that the cooling capacity can be varied depending on component needs and, illustratively, fan speed can be controlled based on temperature within the system.

It is also known to regulate microprocessors in response to sensed temperature. For example, U.S. Pat. No. 6,119,241 entitled "Self Regulating Temperature/Performance/Voltage Scheme for Micros (X86)" to Michail et al. (IBM) optimizes processor performance by switching to an accelerated clock and voltage state when a temperature sensed in the processor is under an optimum temperature. Also, it exercises utilization control over the processor functional units when the temperature exceeds the optimal temperature, and switches to normal clock states and normal voltages at other temperatures.

The preferred embodiment of the present invention, on the other hand, is concerned with enabling an electronic device having a digital processor to operate at an elevated ambient temperature, that is, elevated beyond the temperature at which it could normally operate. It achieves this by controlling the heat generated by the electronic device itself. This is achieved preferably by determining a limit relating to processor performance, arranging the operation of the data processor generally to fall below the determined limit, detecting the processor utilization during operation, and preferably performing a notification if the processor utilization exceeds the determined limit.

SUMMARY OF THE INVENTION

The present invention according to various ones of its aspects seeks to reduce the temperature drop from the semiconductor junctions to the case of the semiconductor component and thereby permits use of an electronic device containing the semiconductor component at a higher ambient external temperature than otherwise normally possible.

In a preferred embodiment, a test unit of the electronic device is constructed and placed at a maximum desired ambient temperature, application software is run on the device, and the processor temperature is noted. If the processor rises in temperature beyond manufacturer's ratings, preferably the application software is adjusted in known ways to reduce the processor utilization to the point where it does not increase the processor temperature unacceptably. A (scalar) value indicative of this utilization level is stored in memory and used as a stored predetermined value for production units of the electronic device in actual use.

An alternative way to determine the maximum sustainable external ambient temperature involves the use of test software (instead of actual application software) which tasks the processor in the electronic device incrementally. With the test unit device being in an environment at the target ambient temperature, the test software is executed. The test software tasks the processor in varying degrees, illustratively increasing the utilization monotonically. The processor has a utilization monitor. During this time, preferably both the utilization value and the temperature of the processor junctions or other usable temperature are monitored, and the manufacturer determines the utilization value at the target external ambient temperature beyond which the processor junction temperature increases unacceptably. The manufacturer stores this utilization value at a memory location accessible to the processor as the stored predetermined value.

Subsequently, after the electronic device is delivered to the end user, preferably in use the processor within the electronic device monitors its actual utilization and compares it to the stored predetermined value, issuing an over-utilization signal in the event of an adverse comparison. In response to such signal, or its equivalent, the user is informed in one or more ways of the condition that the processor is being utilized in a way that may cause its temperature to exceed ratings, allowing the user the option of changing the operating parameters.

BRIEF DESCRIPTION OF THE DRAWINGS

In describing the present invention and its background, reference is made to accompanying drawings wherein.

DETAILED DESCRIPTION OF PREFERRED EMBODIMENTS

Figure 1:
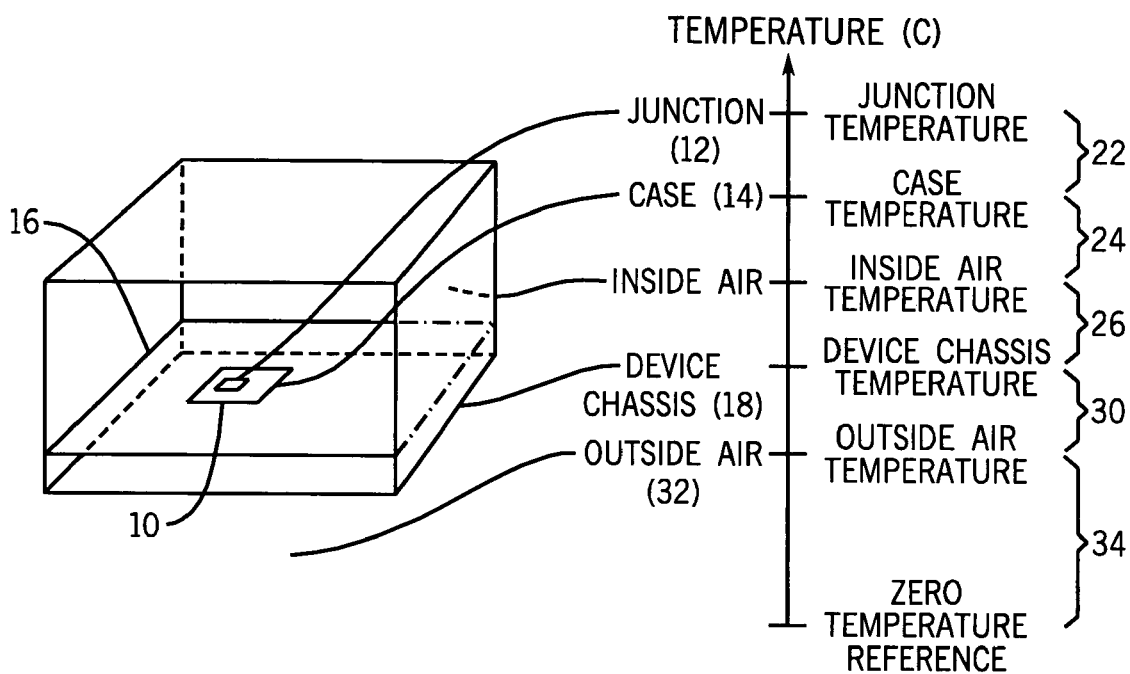
FIG. 1 represents a semiconductor junction in an electrical component in an electrical device along with the various temperatures associated therewith.

A preferred embodiment of the invention is described with reference to the design, manufacture, and use of a piece of electrical equipment containing a microprocessor or microcontroller. This is an "electronic device" with which the present invention can be used. The electronic device can be consumer-oriented, industrial, commercial, vehicular, or otherwise directed. The range of applicability of the present invention is not confined to just these categories, as the invention pertains to providing electronic devices for use in an environment where there is concern over the ambient temperature. One typical application is for an electronic device to be used in a power station, illustratively a normally unmanned station where temperatures are not required to remain within ranges of human comfort but instead are more concerned with operating ranges of the equipment in the station. The particular electronic device in such an environment can be a computer, communications device, relay, switch, or other type of device, many of which are listed above in the Background to the Invention. The electronic device of the preferred embodiment contains a data processor which includes a utilization monitor or the like for monitoring the utilization of processing capacity.

According to various aspects of the present invention, the electronic device made according to the present invention is allowed to operate within a higher external ambient temperature than otherwise possible while still staying within predetermined temperature limits of operation, i.e., a predetermined processor temperature. Preferably, the manufacturer uses a test procedure to correlate or test the junction temperature within the processor with processor utilization. Typically processor utilization is measured as a scalar value, advantageously representing the percentage of utilization of the processor. Hence the utilization value may range illustratively from 0 percent to 100 percent. The testing results will depend on numerous factors including, among others, which specific processor is used, the heat sink, venting, altitude, cooling fans, and the other well known factors concerning heat transfer. The manufacturer of the electronic device determines and stores a target value representing a amount of processor utilization from this testing that provides a certain processor temperature drop. Following the determination of processor utilization, the software used with the processor is controlled so that the processing burden is generally kept below the target percentage. This is also achieved using well known techniques. Alternatively, the manufacturer of the electronic device can determine the target value by an iterative technique wherein actual application software is run on the processor during the test stage, and the processor temperature is monitored to determine the maximum utilization value that does not cause the processor temperature to rise beyond its manufacturer's specified limit. That is, the manufacturer may find that a first arrangement of the application software overburdens the processor, and a next configuration may still overburden it or may not utilize as much as it could. Hence, it is an iterative empirical process. Following this testing and storing of the utilization value, the product is released to the user, whose use may have transitory peaks of high processor usage. Preferably the embodiment chosen does not restrict the end user from operating the processor in any desired fashion. However, according to another aspect of the invention, if the processor operates above its target percentage for a sufficient time, a notification occurs. This may involve a contact closure or other alarm or notification condition to which the end user can respond. For example, the contact closure may actuate an alarm of one sort or another and/or turn on an illumination device (light bulb or LED for example). Additionally, a graphical alarm on the computer screen is presented. Also, an entry is made in a log stored in the computer. Thus, the system is designed to operate at an external ambient air temperature that is higher than normal. Hence the designer may specify the device for a higher maximum allowable external ambient air temperature than otherwise possible. Further, the device can operate without a temperature sensor device.

The junction to case temperature drop is equal to the product of the power dissipated by the semiconductor junctions and the thermal resistance between the junctions and the case. Thus:

$$T_{JC} = R_{\theta JC} \cdot P$$

where $T_{JC}$ is the temperature drop from semiconductor junction to semiconductor case. $R_{\theta JC}$ is the thermal resistance from the semiconductor junction to the semiconductor case. P is the power dissipated at the semiconductor junctions.

Typically the designer of the electronic device containing the semiconductor component cannot control either $R_{\theta JC}$, or P. However, newer processors are capable of reporting, via a readable register, how much of the potential processing performance of the processor is presently being used by the application software. In most modern processors, the power P dissipated by the junctions is related to the amount of processing performance actually being used. According to one preferred aspect of the present invention, the designer of electronic equipment embodying the invention limits or designs the software to be executed by the processor, thereby to limit the amount of processing performance actually utilized to some acceptable level, illustratively 50% of the total potential performance of the processor. This limits the power P dissipated by the junctions of the processor, and from the equation above also limits the temperature drop from the junction of the processor to the case of the processor, thereby limiting the junction temperature.

The designer further designs the remainder of the system and specifies the maximum external ambient air temperature such that the junction temperature of the processor will remain below the maximum allowable value. Preferably the electronic device further includes a feature to alert the end-user if the amount of processor performance actually used exceeds a pre-determined level, say 40% of the total potential performance of the processor. To alert the end user, the processor is programmed to read the register that indicates the actual performance presently used and to take action if the used performance exceeds some threshold, e.g. 40%. The action can be to send a message via a serial port, flash, illuminate, or extinguish a light, open or close a switch contact, etc. Preferably the threshold for the alert is one that will have been determined in a testing stage.

In this way, the system is designed to operate at some external ambient air temperature, given certain assumptions about processor performance utilization. Further, the system has a way to alert the end user if those assumptions are violated. This allows a higher maximum allowable external ambient air temperature to be specified for the device than would otherwise be possible.

Figure 2:
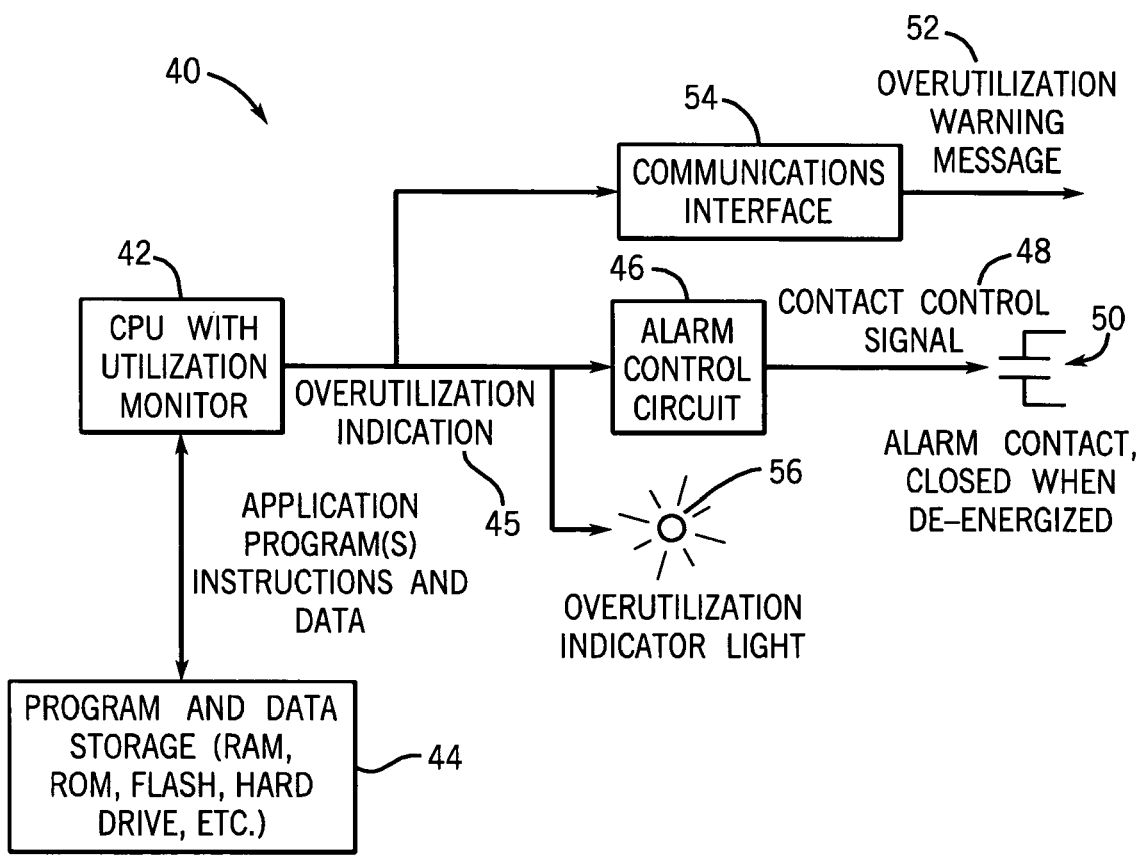
FIG. 2 is a representative block diagram of a computer using aspects of the present invention.

FIG. 2 shows a block diagram of a computing circuit 40 according to various aspects of the present invention. In circuit 40, a CPU or processor 42 retrieves and executes application programs stored in some storage device 44 which can be RAM, ROM, flash memory, a hard drive unit, or another storage device. The CPU or processor 42 has a utilization monitor that allows the CPU or processor 42 to measure its own utilization. The utilization monitor (not separately shown) typically makes the utilization available via a readable register. The utilization measurement or report available from the monitor can be a scalar quantity, a percentage, a relative value (e.g., a decimal fraction between 0.0 and 1.0), or some other value. The CPU 42 reads the register and obtains the value that represents its own utilization. For example if the CPU executes application programs 70% of the time and is idle (does not execute programs) 30% of the time, then the utilization monitor reports 70% utilization, either by reporting "70%" or 0.7 or some other indication of use. The invention relies on the principle that the more a processor is utilized, the more power it uses and thus the more heat it generates. For example, a processor that is 70% utilized dissipates about 70% as much power as (or at least it dissipates less power than) one which is 100% utilized.

Before releasing the electronic equipment to the user, the manufacturer in the preferred embodiment of the invention will have established a predetermined threshold value for processor utilization. When CPU 42 reads the utilization monitor, it compares the actual utilization reading (value) obtained therefrom against the predetermined threshold. If the processor utilization reading exceeds the predetermined threshold, the processor can take any of several actions. It may issue an overutilization indication 45 to actuate an alarm control circuit 46 to issue a warning alarm by generating contact control signal 48 which closes an alarm contact 50 as shown in FIG. 2. Processor 42 can also or alternatively send a warning message 52 to some external equipment via a communications interface 54. The processor can also or alternatively illuminate, flash, or extinguish a light 56 as a means of warning the user of an over utilization condition.

Figure 3:
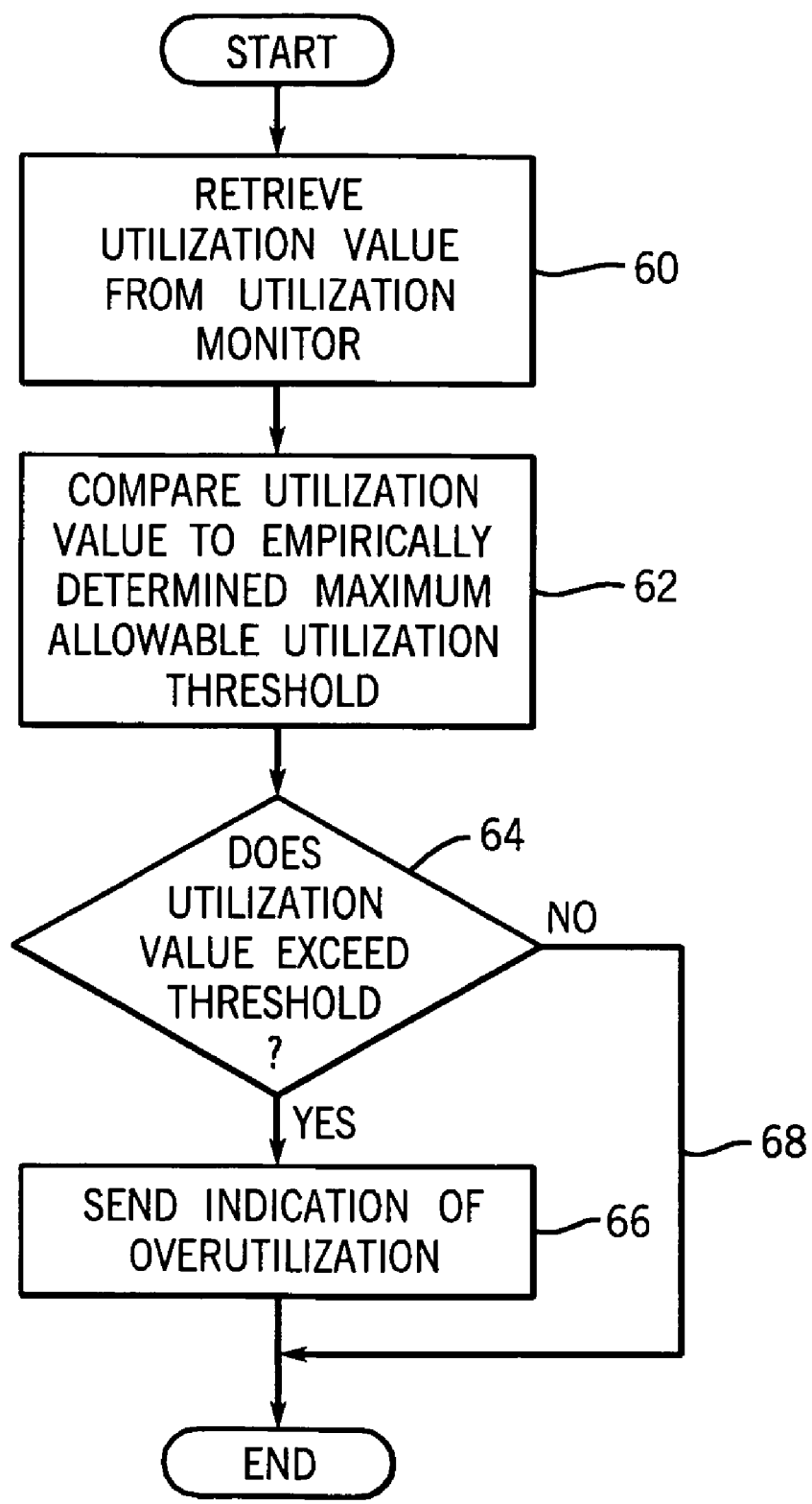
FIG. 3 is a flow chart showing operation of an over-utilization alarm according to aspects of the present invention.

This process for the installed device is depicted in the flow chart of FIG. 3. At a step 60, the processor 42 retrieves the utilization value from the utilization monitor. At step 62, processor 42 compares the utilization value to the predetermined threshold. At decision diamond 64, if the utilization value exceeds the threshold, at step 66 it sends the overutilization indication 45 and the process ends. Alternatively, the process ends if the comparison shows that the threshold has not been exceeded, as indicated at 68.

As noted above, the presently preferred form of practicing the present invention according to different aspects of the invention involves determining and later using a predetermined threshold. By way of overview, the determination of this threshold is achieved preferably in the following manner. The manufacturer or designer selects a maximum target operating temperature for the electronic device. Typically this is the maximum external ambient air temperature. He then determines the amount of processor utilization that will allow the processor junction temperature to remain below the maximum allowable temperature specified by the processor manufacturer. This amount or value of processor utilization becomes the "predetermined threshold," and the system stores this value as the predetermined threshold in a memory location accessible to the processor. As noted above, this value determination can be made using actual application software in a test stage or by using test software to task the processor in varying amounts, as described more fully below. Next the designer designs application software which utilizes the processor less than the amount determined in the previous step. The designer also preferably implements the circuitry and/or flow chart described above so that the CPU sends some sort of warning condition if the processor utilization exceeds the threshold determined previously.

The selection of the maximum target operating temperature for the electronic device is typically determined by market forces. If the manufacturer can increase the maximum target temperature which the device can sustain, it will likely sell more devices. For example, if it sets the maximum target temperature for the device at 65 degrees Centigrade, it probably will sell fewer devices than the maximum target temperature were set at 75 degrees Centigrade.

Setting the Pre-Determined Processor Utilization Value

Once the maximum target temperature is selected, one must determine the maximum amount of processor utilization allowed and arrange the application software to stay within that maximum, i.e., the application software utilizes the processor less than the determined amount. Preferably this is achieved empirically by testing. Two methods are described for this. It will be understood, however, that one may use other aspects of the invention without using the particular testing described herein. In both of the methods described herein for setting the predetermined processor utilization, a test unit of the electronic equipment is manufactured to include the same features as a production unit. That is, it includes the same processor in the same package connected to the same circuit board, with the same heat sinks, cooling fins, and other relevant apparatus. The test unit is placed in a temperature controlled environment, and the ambient temperature is raised to the desired maximum target temperature, e.g., 75 degrees C.

According to the first method, the manufacturer causes the test unit to execute the desired application software on its internal processor. While this application software is executing, the manufacturer monitors at least the temperature of the processor, or both the processor utilization and the temperature of the processor in use, in the test device, at the target ambient external air temperature. If the temperature of the processor rises above the temperature specified by the processor manufacturer, then the processor utilization is too great. In response, the designer preferably reduces the amount of application software that the processor must execute. This increases the amount of time that the processor is not executing any application software. When the processor is not executing application software, it dissipates less power than when it is executing application software. Roughly if the processor executes application software half of the time and does not execute software half of the time, it will dissipate about half as much power as it would if it were executing software all of the time. The designer reduces the amount of application software the processor must execute until the processor temperature reduces to an acceptable level, as defined previously. The designer then records the processor utilization and the application software configuration required to reach the acceptable temperature level.

Conversely, if the designer finds that the processor temperature is below the target level, he may opt to increase the amount of application software required to be executed by the processor. This increases the amount of power dissipated by the processor and consequently increases the temperature of the processor. He then records the processor utilization and the application software configuration required to reach the acceptable temperature level. That is, the processor utilization that the manufacturer (designer) has determined is stored in a memory location accessible to the processor for later use, as explained above with reference to FIGS. 2 and 3.

To reduce or increase the amount of application software that the processor must execute, the designer can reduce or increase the feature set of the device. For example he can reduce or increase the number of other devices with which the target device must communicate. In another example he can reduce or increase the amount of data the device must receive, process, and/or transmit. The designer can also reduce the rate at which normally scheduled tasks execute. For example, if the device is designed to poll several other devices periodically, the designer could reduce the frequency of polling from once per second to once per minute. In another example, he can reduce or increase the speed at which the device responds to external input, such as user input from keyboard, mouse, etc, or such as input from other devices like network communications. These are routine tasks for software designers and engineers in the applicable discipline.

Once the designer determines the processor utilization amount that permits the electronic device to operate at the selected maximum ambient temperature without causing the processor temperature to rise beyond its manufacturer's specification, that amount is stored in a memory location accessible to the processor. As discussed previously in connection with FIG. 2, that memory location is accessed and the stored predetermined value is used after delivery of the electronic device to the customer.

A second method to set the predetermined processor utilization value is to use test software instead of actual application software. In the first method described above, the determination is largely empirical, as the designer may find that a first arrangement of the application software overburdens the processor, and a next configuration may still overburden it or may not utilize it as much as it could. Hence, it is an iterative empirical process. In a second method, the test unit of the electronic device is again placed at in the test condition where the external ambient temperature is the temperature which the manufacturer wishes to specify for the device. Of course, internal temperatures within the electronic device will be higher than the external air temperature due to the power dissipation of the device, and it will depend on heat sinks, venting, etc., as described above. With the test unit device in the test condition, the test software is executed. The test software tasks the processor in varying degrees, illustratively increasing the utilization monotonically. The processor has a utilization monitor. During this time, at least the temperature of the processor junctions or other usable temperature are monitored, or preferably that temperature along with the utilization value are monitored, and the manufacturer determines the utilization value at the target external ambient temperature beyond which the junction temperature increases unacceptably.

For example, assume that the desired external air temperature is 75 degrees C. and that the maximum junction temperature specified by the processor manufacturer is 100 degrees C. The test can increase the processor utilization in one percent intervals. The test will monitor the processor junction temperature at zero percent utilization, one percent, two percent, and so on as the test progresses. The test may show that at the specified external air temperature of 75 degrees C., the junction temperature in the processor remains below 100 degrees C. so long as the processor utilization remains below, illustratively, 43 percent. The manufacturer stores this utilization value (43%) at a memory location accessible to the processor as the stored predetermined value. The designer then examines the actual application software to see how much it utilizes the processor. If the actual utilization is higher than 43% (the predetermined value), then the designer adjusts the software as described above to use the processor less. On the other hand, if the actual application software utilizes the processor only 30%, then the designer may wish to augment the software. The designer may then perform a verification step to verify that when the adjusted application software is run in the electronic device when placed at the target external ambient air temperature, the junction temperature within the processor remains below the processor manufacturer's specification, illustratively 100 degrees C.

To recapitulate, the manufacturer selects a maximum ambient air temperature for an electronic device to be manufactured, which electronic device includes a data processor equipped with a utilization monitor. A test unit of the device is manufactured and placed under test at the maximum ambient air temperature. The temperature of the processor and its utilization reading are observed. The processor temperature, and hence the temperature of the junctions within it, are predictably higher than the ambient temperature due to the temperature differentials explained with respect to FIG. 1. The manufacturer of the processor will have specified a maximum temperature for that component, and the manufacturer of the electronic device using such processor must assure that in normal operation the device does not cause the processor temperature to exceed its temperature specification. Thus the manufacturer during this test stage runs either the actual application software or test software for the electronic device at this time, in the test state. If actual application software is being used and the processor temperature increases out of range, then the software should be changed so that it utilizes less processing capacity of the processor and, correspondingly, results in the dissipation of less power by the processor in executing the necessary tasks. Once a suitable reduction or adjustment is made in the software which during testing is shown to allow operation of the electronic device at the maximum ambient temperature without the processor temperature exceeding specifications, the utilization value imposed by that software on that particular processor is stored in memory. If test software is being used, then the designer can determine the maximum processor utilization allowed which keeps the junction temperatures in the processor within manufacturer's specifications, and the designer then conforms the actual application software to that determination. In either case, the electronic device preferably is constructed in production quantities with the circuitry shown in FIG. 2 using the process flow of FIG. 3. Hence, if the user should task the processor beyond the predetermined limit, preferably the electronic device will communicate that to the user who may elect to change conditions or not, as the user sees fit.

It will be understood that the present invention can be used to control the maximum junction temperature in the processor to be predetermined value, which could be the maximum specified by the manufacturer of the processor, or a different temperature preferred by the designer of the electronic equipment.

It will be appreciated that the foregoing description is directed to an illustrative embodiment of the present invention and that numerous changes can be made without departing from the scope or spirit of the invention.

I claim:

1. A method of operating an electronic device containing a data processor comprising the steps of:
    accessing a storage location storing a predetermined target value representing an amount of processing utilization for the electronic device;
    monitoring a data processing utilization value during use; and
    providing notification if the data processor utilization value exceeds said predetermined target value;
    whereby said electronic device may be operated at a higher ambient target temperature than otherwise possible,
    wherein the predetermined target value is determined in a testing stage prior to use, said testing stage including testing an electronic device test unit having the data processor installed therein, said testing including
        (a) placing a test unit of the electronic device in a temperature controlled environment,
        (b) setting the temperature in said environment to said ambient target temperature,
        (c) executing software on said data processor while the test unit is in the temperature controlled environment which is at the ambient target temperature, and
        (d) monitoring the data processor temperature during said testing step;
    the method further comprising determining a processor utilization value representative of processor utilization that allows said temperature of said processor to remain below a predetermined processor temperature.

2. The method of claim 1 wherein said software is actual application software for the electronic device, and wherein the determining step includes adjusting said application software so that said processor temperature when running said software remains below said predetermined processor temperature.

3. The method of claim 1 wherein said software is test software for utilizing said processor in varying degrees, and wherein said determining step includes recording a utilization value of the processor which allows said processor to remain below said predetermined processor temperature, and wherein the method further comprises adjusting application software to be run on said processor so that said processor is generally not utilized beyond said utilization value.

4. In a method of manufacturing an electronic device containing a data processor:
    determining a processor utilization value that allows a temperature of said processor to remain below a predetermined processor temperature when the external air temperature for said electronic device is at a specified amount including a testing step comprising:

placing the electronic device in a temperature controlled environment;

executing software on said data processor; and monitoring the data processor temperature, and adjusting application software to be run on said data processor so that the processor utilization when running said application software is generally below said determined utilization value;

wherein said testing step is conducted with said data processor installed in the electronic device, wherein said testing step includes placing the electronic device, having the data processor installed therein, in a temperature controlled environment including setting a temperature of said temperature controlled environment to a target temperature for operation of the electronic device.

5. The method of claim 4 wherein said software comprises application software.

6. The method of claim 4 wherein said adjusting step is performed in response to said testing step indicating that the data processor temperature differs from said predetermined processor temperature.

7. The method of claim 4 wherein said determining step includes a testing step including: executing test software for utilizing said processor of said electronic device in varying degrees, monitoring the utilization of said processor when running said test software, and monitoring the processor temperature during said testing step; and wherein said determining step comprises recording a utilization value of said processor which allows said processor to remain below said predetermined processor temperature.

8. The method of claim 7: wherein said testing step is conducted with said data processor installed in the electronic device, wherein said testing step includes placing the electronic device, having the data processor installed therein, in a temperature controlled environment.

9. The method of claim 8 including setting a temperature of said temperature controlled environment to a target temperature for operation of the electronic device.

10. The method of claim 7 wherein said adjusting step is performed in response to said testing step indicating that the data processor temperature differs from said predetermined processor temperature.

11. The method of claim 4 including determining when the data processor is being utilized in an amount in excess of the determined processor utilization amount and providing an indication thereof.

12. The method of claim 11 including providing an alarm in response to said excess utilization determination.

13. The method of claim 11 including communicating an overutilization warning message via a communications interface.

14. The method of claim 11 including illuminating a light source in response said excess utilization determination.

15. A method of manufacturing an electronic device containing a data processor, where the electronic device is to operate at a target temperature while keeping a maximum temperature for the data processor below a predetermined processor temperature, comprising the steps of: constructing an electronic device test unit having the data processor installed therein; testing said test unit, said testing including (a) placing said test unit in a temperature controlled environment, (b) setting the temperature in said environment to the target temperature, (c) executing software on said data processor while the test unit is in the temperature controlled environment which has the target temperature, (d) monitoring the data processor temperature during said testing step, and (e) determining a processor utilization value that allows a processor temperature to remain below said predetermined processor temperature; if said testing step indicates that the data processor temperature differs from said predetermined processor temperature when said electronic device is at the target temperature, then adjusting application software to be run on said data processor so that the processor utilization is generally below said determined value.

16. The method of claim 15 including increasing the processor utilization in response to said testing step if the data processor temperature is below said predetermined processor temperature.

17. The method of claim 15 wherein said testing executes application software on said processor.

18. The method of claim 15 wherein said testing executes test software on said processor.

* * * * *